United States Patent
Swissa et al.

(10) Patent No.: US 9,955,345 B2
(45) Date of Patent: Apr. 24, 2018

(54) SYSTEM AND METHOD FOR MOBILE NETWORK ACCESS POINT NAME VIRTUALIZATION

(71) Applicant: StarHome Mach GmbH, Zurich (CH)

(72) Inventors: Shounit Swissa, Ganei-Am (IL); Shai Eilat, Tel-Aviv (IL)

(73) Assignee: StarHome Mach GmbH, Zurich (CH)

( * ) Notice: Subject to any disclaimer, the term of this patent is extended or adjusted under 35 U.S.C. 154(b) by 141 days.

(21) Appl. No.: 15/015,207

(22) Filed: Feb. 4, 2016

(65) Prior Publication Data

US 2016/0234681 A1 Aug. 11, 2016

Related U.S. Application Data

(60) Provisional application No. 62/112,238, filed on Feb. 5, 2015.

(51) Int. Cl.
| | |
|---|---|
| *H04W 8/26* | (2009.01) |
| *H04W 4/00* | (2018.01) |
| *H04L 29/08* | (2006.01) |
| *H04W 8/18* | (2009.01) |
| *H04W 76/02* | (2009.01) |
| *H04W 88/08* | (2009.01) |
| *H04W 84/04* | (2009.01) |

(52) U.S. Cl.
CPC .............. *H04W 8/26* (2013.01); *H04L 67/28* (2013.01); *H04W 4/005* (2013.01); *H04W 8/18* (2013.01); *H04W 76/02* (2013.01); *H04W 84/04* (2013.01); *H04W 88/08* (2013.01)

(58) Field of Classification Search
CPC ..... H04W 8/26; H04W 4/005; H04W 88/182; H04L 67/28; H04L 29/08702; H04L 29/12009; H04L 29/12018; H04L 29/153; H04L 29/1258; H04L 61/10; H04L 61/25; H04L 61/255
See application file for complete search history.

(56) References Cited

U.S. PATENT DOCUMENTS

| | | | |
|---|---|---|---|
| 9,699,716 B1* | 7/2017 | Osterwise | H04B 1/3816 |
| 2003/0058874 A1* | 3/2003 | Sahaya | H04L 12/66 370/401 |
| 2004/0029615 A1* | 2/2004 | Gerry | H04L 29/12009 455/560 |
| 2011/0103310 A1* | 5/2011 | Stojanovski | H04L 12/66 370/328 |
| 2011/0249618 A1* | 10/2011 | Shaw | H04W 8/26 370/328 |
| 2012/0147834 A1* | 6/2012 | Zisimopoulos | H04L 29/12066 370/329 |
| 2012/0214445 A1* | 8/2012 | Stojanovski | H04L 63/164 455/411 |
| 2013/0044638 A1* | 2/2013 | Lu | H04W 8/26 370/254 |

(Continued)

*Primary Examiner* — Warner Wong

(57) ABSTRACT

Mobile and in particular Internet of things (IoT) devices have access point names (APN) for identifying network servers with which they are supposed to communicate. Disclosed are network devices and methods for APN virtualization to manage the mobile devices. The network device may replace an original APN with an assigned APN by looking up the mobile device in a database, based on a device identification. The modified APN is then used in a standard DNS lookup.

8 Claims, 5 Drawing Sheets

(56) References Cited

U.S. PATENT DOCUMENTS

| | | | |
|---|---|---|---|
| 2013/0157659 A1* | 6/2013 | Ikeda | H04W 12/08 455/435.1 |
| 2014/0026207 A1* | 1/2014 | Wang | H04L 41/28 726/12 |
| 2015/0052234 A1* | 2/2015 | Hahn | H04L 61/6013 709/223 |
| 2015/0063301 A1* | 3/2015 | Faccin | H04W 8/02 370/331 |
| 2016/0150578 A1* | 5/2016 | Mancevska | H04W 4/005 455/422.1 |
| 2017/0127458 A1* | 5/2017 | Orton | H04W 76/02 |
| 2017/0150420 A1* | 5/2017 | Olsson | H04W 40/248 |
| 2017/0223523 A1* | 8/2017 | Keller | H04W 8/02 |
| 2017/0359845 A1* | 12/2017 | Mancevska | H04W 8/12 |

\* cited by examiner

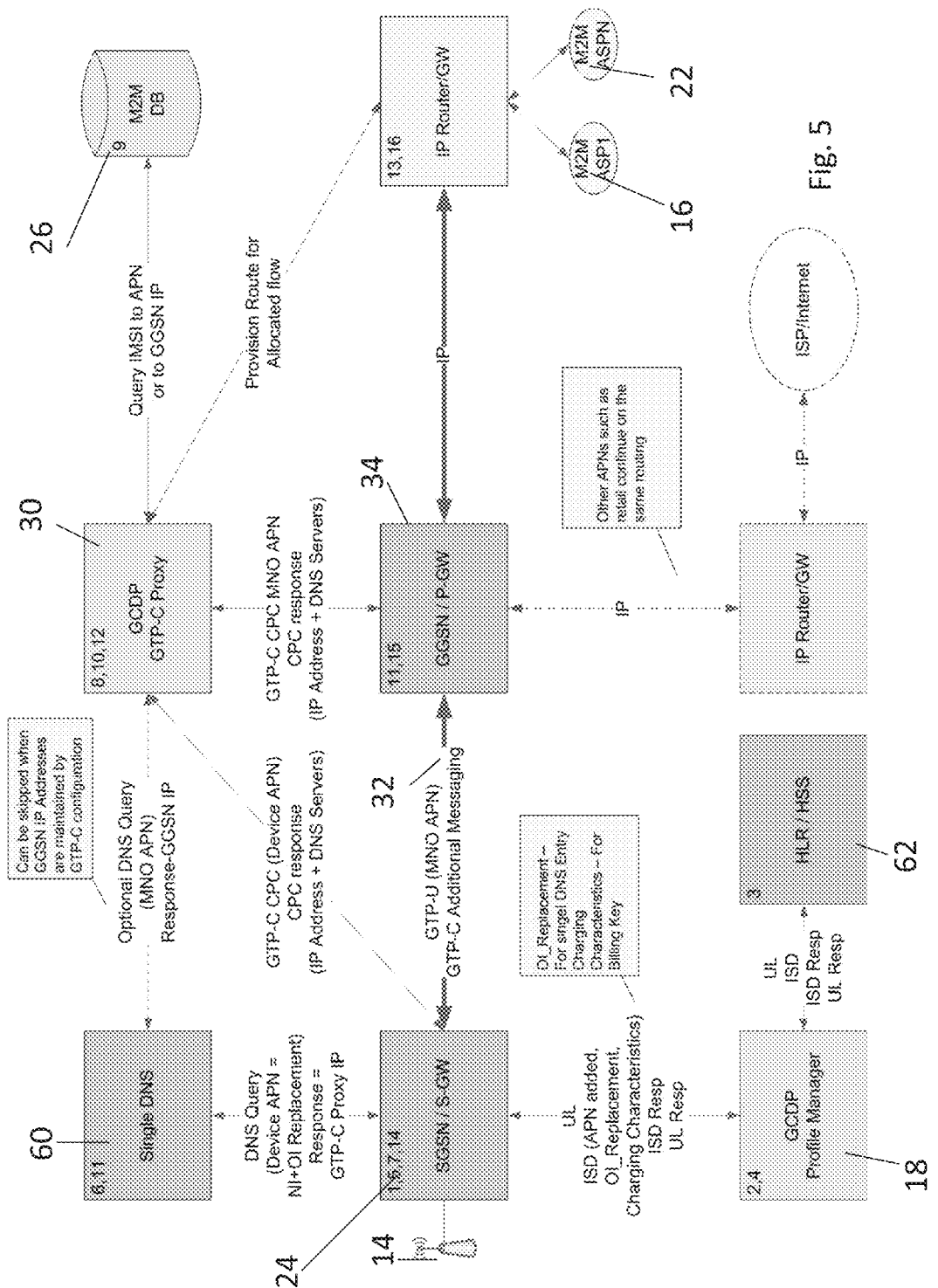

SYSTEM AND METHOD FOR MOBILE NETWORK ACCESS POINT NAME VIRTUALIZATION

RELATED APPLICATION

This application claims the benefit of priority under 35 USC § 119(e) of U.S. Provisional Patent Application No. 62/112,238 filed on Feb. 5, 2015, the contents of which are incorporated herein by reference in their entirety.

FIELD AND BACKGROUND OF THE INVENTION

The present invention, in some embodiments thereof, relates to a system and method for mobile network access point name (APN) virtualization and, more particularly, but not exclusively, to such virtualization in relation to mobile devices, including machine to machine devices of the Internet of Things (IoT).

The IoT (Internet of Things)/M2M (Machine to Machine) markets impose new challenges for mobile operators. Although not all IoT devices are actually mobile, they are considered herein as a subset of mobile devices since they communicate via the cellular, Internet, Wifi and other wireless networks. Some of the challenges relate to APN (Access Point Name) provisioning and management. Each cellular or mobile device has its own built in APN—access point name, which is generally the name of a server on the network through which Internet data is sent to and from the connecting IoT device, and, in the cellular network, the APN is used for finding the path for connecting a data session. When a device initiates a data session, it connects to the SGSN in a 2G/3G network, or the Serving Gateway of an LTE/4G network, or similar equipment in other cellular networks. The SGSN initiates a request for a new data session towards the core network GGSN (or the P-GW or PDN gateway in LTE networks), using GTP (GPRS Tunneling Protocol) or MIP/PMIP or other protocols corresponding to the type of networks. In order to find the IP address of the destination (the GGSN/P-GW), there is a need to use the APN that was sent by the device. The SGSN resolves the APN via DNS, translating it to an IP address of the GGSN/P-GW.

The APN is configured within the device itself, and there may be different APNs for different purposes, such as Internet, MMS (Multi-Media System), IMS/VoLTE (Voice over LTE) and of course M2M. Since at the time of manufacturing it is not always known what serving network the device may end up using, APN configuration is a serious burden. A service provider that needs to split devices between various networks needs to take care of the APN and configure the appropriate APN for each device for the actual use of the device.

A similar problem arises from the need for private APNs for certain M2M verticals (businesses, such as connected cars or e-health service providers). Such service providers may be interested in a dedicated APN, as a way of easing the billing process and the routing of all the data via a private VPN tunnel to the enterprise servers. There is thus a need to pre-configure the devices for specific verticals, with private APNs.

Another problem is the need to configure the network components with all the various private APNs. The components that need the APNs configured therein are mainly the GGSN/P-GW, and also the DNS servers.

The IoT device typically connects via the nearest base station to an SGSN (3G) Serving gateway (4G), which could be in the device's home network or in a roaming network, depending where the device happens to be located. The network then receives the APN as a string, and the string is sent to the DNS server to do APN resolution. The resolution process is the standard DNS Internet address resolution process but working on the cellular network. The APN is resolved and the connection is passed on to the GGSN (P-GW) which is at the home network. From there the connection is passed to the Internet to allow the device to access the Internet and the server that the device is programmed to communicate with.

M2M stands for machine to machine—and the devices include the smart meters, distributed sensors etc. that make up the Internet of things—if connected to the Internet.

M2M generally has specific GGSN servers that are different from those used by other devices and protocols. The GGSN may then direct the connection onwards, if necessary via secure VPN. Specific APNs may be assigned for providers of the smart devices or for end users of the devices, thus the US Police Service has its own designated APN for surveillance cameras.

As explained above, the APN is set up on the device itself and is not part of the SIM card. This raises a problem if it is necessary to change the APN, for example if the device is set up on a network other than that initially intended, or if the device is to be run by a provider other than that initially intended. Thus the operator may even go so far as to replace the SIM card but will still fail to change the APN. In fact the M2M standards for mobile network allows for a SIM download, in which it is possible to remotely reconfigure the SIM card when moving to different provider. However the SIM download does not change the APN. Rather the device itself has to be reconfigured. But often there is no-one to reconfigure the device. Remote sensors may be serviced only very rarely, and IoT devices may be owned and used without the owner particularly being aware that the device is present. There are solutions, it is possible to accept an SMS that will reconfigure the device, but a remote electricity meter or the like has no-one to accept the SMS. Another solution is to allow the device to operate scripts that are sent remotely, but allowing such scripts to run presents a security hazard.

An example of the problem is the case of car manufacturers such as BMW who provide SIM cards in all their vehicles. However the cars need different APNs for the specific country in which the vehicle is to be used, information which is not necessarily available at the time of manufacture, and cars can travel across borders.

A system provided by CISCO systems provides a virtual APN which is placed in the device's home location register (HLR). The virtual APN leads to one or more real APN's which can then be used to connect the device to a server which is different from that defined in the device, the real servers being identified by usernames provided by the device. The solution allows the device to be used with an APN other than that defined in the device, but the solution requires making changes to the HLR, which is generally discouraged in cellular systems, where the HLR is considered as a critical resource. In addition, the device needs to be tailed for the Cisco solution, and contain a specific indication for the network to use a virtual APN for it, such as a "virtual" indication in the username field that the device outputs towards the network. These two restrictions—of provisioning the HLR and the device are a serious limitation. It is noted that HLR in this document refers to the HLR of the 2G/3G mobile network, or the HSS of a 4G LTE network.

SUMMARY OF THE INVENTION

The present embodiments provide APN virtualization which does not rely on username information provided by the device and does not require any modification to be made to an HLR.

According to an aspect of some embodiments of the present invention there is provided a networked apparatus for a cellular network, the apparatus configured for connection to mobile devices via said cellular network, the mobile devices being respectively associated on said network with device identification, the apparatus comprising a database associating device identifications with newly assigned access point names (APNs), the apparatus being configured to replace a respective original access point name with a respective newly assigned access point name obtained from said database using said device identification as an index.

In an embodiment, said device identity comprises an International mobile subscriber identity (IMSI).

In an embodiment, the mobile devices which are respectively associated on said network with a device identity, and are respectively configured with original access point names for onward connection, may have the original access point names replaced with an assigned access point name based on a lookup with the device identity, for example the IMSI.

The networked apparatus may operate as a GTP-Relay/Proxy, the GTP-Relay/Proxy having a proxy address and its operation comprising:
  receiving GTP-C (Control) messages;
  modifying said GTP-C messages by said replacing; and
  inserting said GTP-Relay/Proxy address as a proxy; and
  relaying said modified messages to the GGSN.

The networked apparatus may receive a Create-PDP-Context GPRS message, and then use said assigned access point name to relay the Create-PDP-Context towards a GGSN in said network.

The networked apparatus may subsequently:
  receive a response from said GGSN;
  set a mobile network GGSN address of said GGSN as a destination address for a GTP-U stream, thereby to set up a communication tunnel for said respective mobile device; and
  relay said response to an originating SGSN.

The mobile device may be an Internet of Things (IoT) device. Not all IoT devices are in fact physically mobile, but since they are networked via various wireless systems they are referred to herein as mobile. The mobile device may be a machine to machine (M2M) device connected to communicate with other devices, and the network may be a cellular network including MAP and Diameter—type networks or any other kind of cellular network or wifi, or Internet or any combinations of these networks, a wifi or cellular connection leading to a server on the Internet being quite common.

According to a second aspect of the present invention there is provided a method for managing mobile devices on a cellular network, the mobile devices being respectively configured with original access point names for onward connection, the method comprising:
  looking up a device identification on a network;
  replacing a respective original access point name with an assigned access point name based on said look up of a device identification on the network; and
  providing a modified address for onward connection of the respective mobile device based on said assigned access point name.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5 is a simplified schematic diagram showing the embodiment of FIG. 2 in greater detail.

DESCRIPTION OF SPECIFIC EMBODIMENTS OF THE INVENTION

Figure 1:
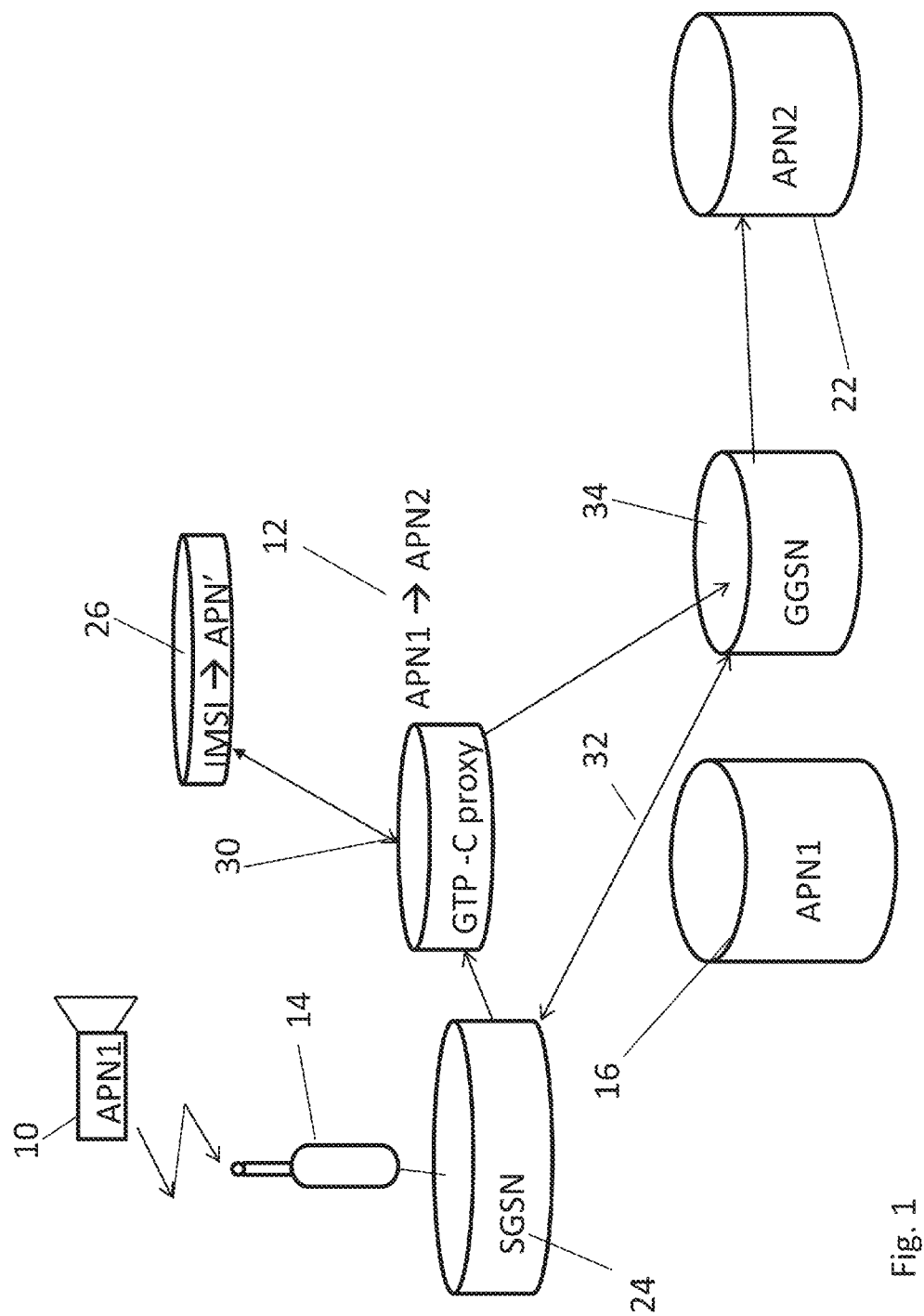
FIG. 1 is a simplified schematic diagram showing an embodiment of the present invention using a GTP-C relay/proxy.

The present invention, in some embodiments thereof, relates to a system and method for mobile network access point name (APN) virtualization and, more particularly, but not exclusively, to such virtualization in relation to machine to machine devices of the Internet of Things (IoT).

Internet of things (IoT) devices have access point names (APN) for identifying network servers with which they are supposed to communicate. Disclosed are network devices and methods for APN virtualization to manage the IoT devices and allow them to set up communication sessions with the correctly intended server as opposed to the server they were initially configured for. One such network device may replace an original APN with an assigned APN by looking up the IoT device in a database. The device's International mobile subscriber identity or IMSI may be used as the index to look up the assigned APN.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is made to FIG. 1, which shows a situation in which mobile or IoT device 10 is configured with APN1. APN1 identifies server 16 but the device requires to communicate using server 22. Device 10 is associated on the network with an international mobile subscriber identity (IMSI), but any other device identity could be used in place of the IMSI and use of the term "IMSI" anywhere in this document is to be construed as including any device specific identity. GTP-C relay/proxy device 30, located on the network, is connected to database 26 and using the database, relay/proxy 30 uses the IMSI as an index to find out if a modified APN has been assigned to the device. If so the GTP-C relay/proxy 30 modifies session setup messages by replacing the original access point name with an assigned access point name and a session is set up with server 22 using APN2 instead. The session itself, a GTP-U session, is indicated by arrow 32 and does not involve the GTP-C relay/proxy once the session setup handshake is complete, or at least an initial setup message and a reply have been exchanged.

GPT-C relay/proxy 30 may operate as a proxy for a GTP-Relay, by receiving GTP-C (Control) messages and modifying the GTP-C messages with the assigned APNs. The relay/proxy 30 may act as a GGSN towards SGSN 24 by terminating the GTP-C sessions, and initiating a new GTP session that replaces the terminated GTP session. The new session may be directed to GGSN 34 which connects server 22 into the network. More particularly, relay/proxy 30 may receive a Create-PDP-Context GPRS message which it terminates. The relay/proxy then uses the assigned access point name to initiate a new Create-PDP-Context towards GGSN 34. An alternative may simply relay the original Create-PDP-Context GPRS message, without any termination.

The relay/proxy 30 receives a response from GGSN 34 and sets the mobile network GGSN address of GGSN 34 as a destination address for a GTP-U stream—arrow 32, The GTP-U stream provides a communication tunnel for the IoT device to server 22. Once the response is relayed to the SSGN 24 the GTP-C relay/proxy need play no further part in the communication.

Figure 2:
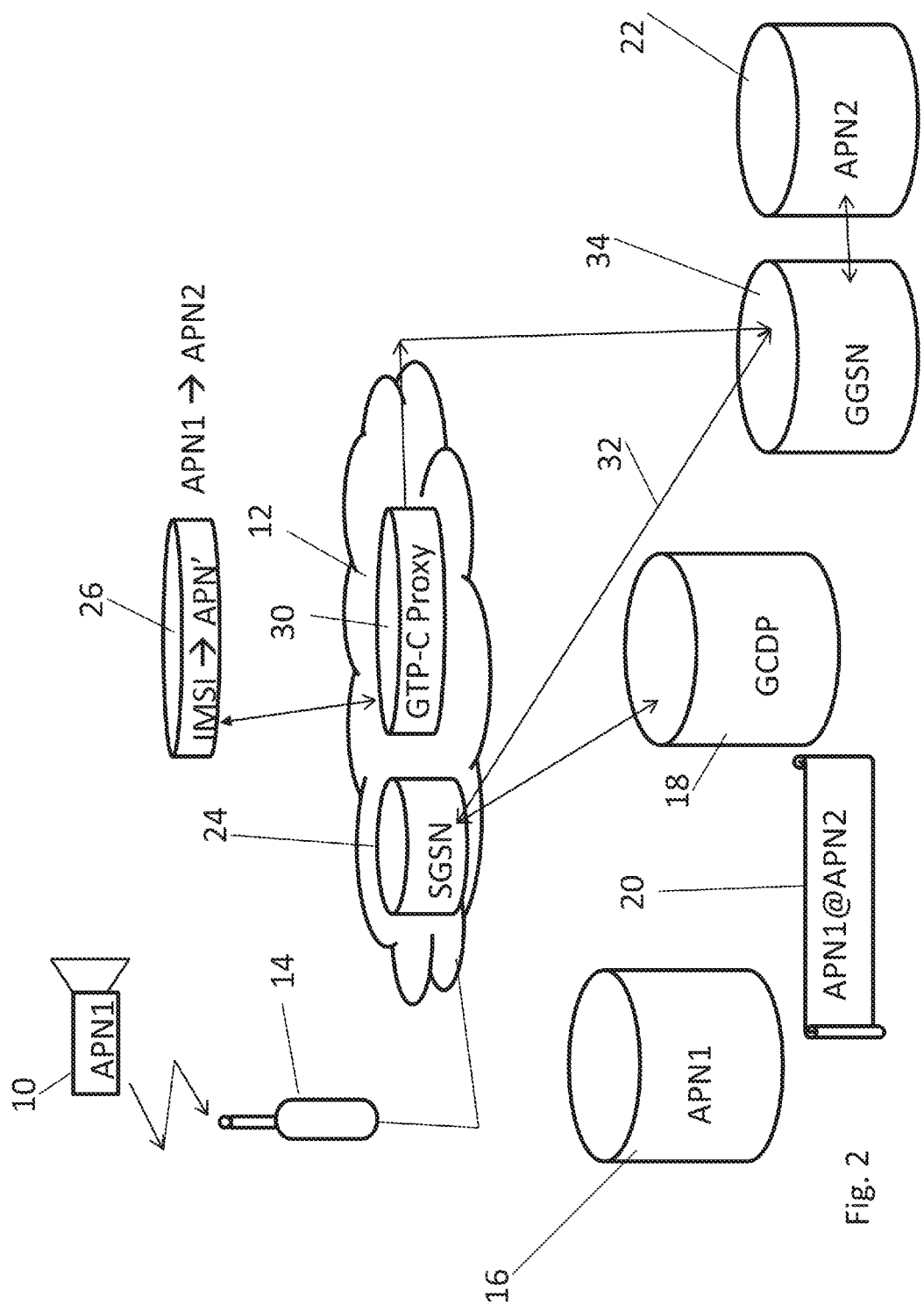
FIG. 2 is a simplified schematic diagram showing an embodiment of the present invention using both a GCDP and a GTP-C relay/proxy.

Reference is now made to FIG. 2, which is a simplified diagram showing a configuration of the present embodiments in which both the GCDP and the GTP-C relay/proxy are used together. Parts that are the same as in previous embodiments are given the same reference numerals and are not described again except as needed for an understanding of the present embodiment. Again, IoT device 10 connects to the network 12 and to SGSN 24. IoT device 10 is programmed internally to open a session with server 16 having address APN1. However the device is in fact required to open a session with server 22 having address APN2. Device 10 has an IMSI which is known to the network and the IMSI is used by GTP relay/proxy 30 as an index to look in database 26 to see if there is a modified APN set for that device. If there is then the replacement APN, APN2 is set. GCDP 18 converts APN1 to APN2, based on the relevant information stored in the database. The substituted APN, APN2, is used to provide a modified address for onward connection of IoT device 10, specifically for DNS lookup, which will be discussed in greater detail below with reference to FIG. 5. The GTP relay/proxy 30 sets up a GTP-U communication tunnel with server 22 as before and the tunnel operates via GGSN 34.

Figure 3:
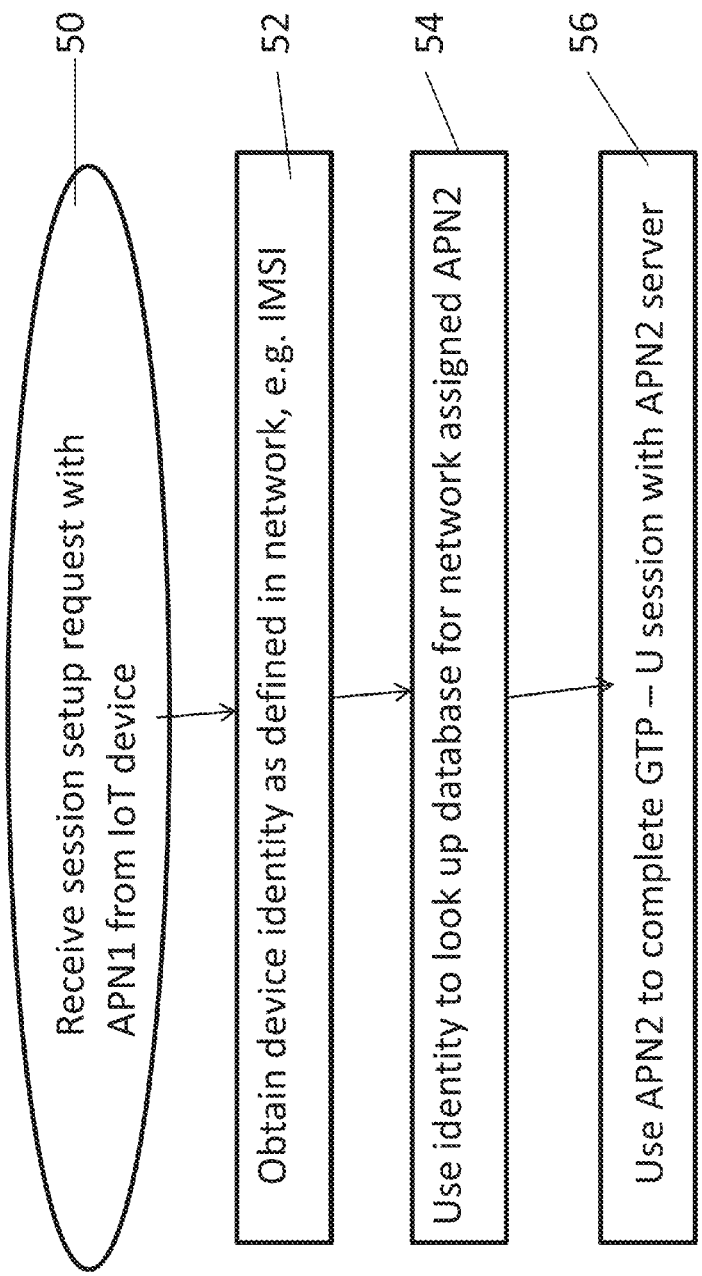
FIG. 3 is a simplified flow diagram showing operation of the embodiment of FIG. 1.

Reference is now made to FIG. 3, which is a simplified flow diagram illustrating a method of setting up a communication session between an IoT device and an M2M server using APN virtualization according to an embodiment of the present invention. A request to set up a session is received—50— from an IoT device using an APN, APN1, that is included on the device. Then the international mobile subscriber identity number (IMSI) corresponding to the device is obtained—52.

The IMSI is used to look up a database to find a corresponding assigned access point name if there is one—54. If there is such an assigned APN, APN2, then the assigned APN2 is used—56—to set up a session for the IoT device with the server identified by the APN2 name. The session may be a GTP—U session, which provides a communication tunnel between the device and the corresponding server.

The session setup message may be a GTP-C (Control) message and would initially have the APN1 original access point name from the device. The message is then modified by replacing the original access point name APN1 with the assigned access point name APN2 prior to sending onwards. The modification may involve acting as a GGSN, and terminating the initial GTP-C sessions, then initiating a new GTP session towards a GGSN to carry the modified message.

The method may involve receiving a Create-PDP-Context GPRS message, which identifies the device, then fetching the IMSI which the network associates with the particular IoT device, and using the IMSI as an index to look up the database to match the IMSI with the assigned access point name APN2 if there is one. The new APN2 is then used in a new Create-PDP-Context which is sent towards the GGSN.

The process of setting up the session of FIG. 3 may involve providing a modified address for onward connection of the respective IoT device, by using the replaced APN, APN2 in the DNS lookup.

Figure 4:
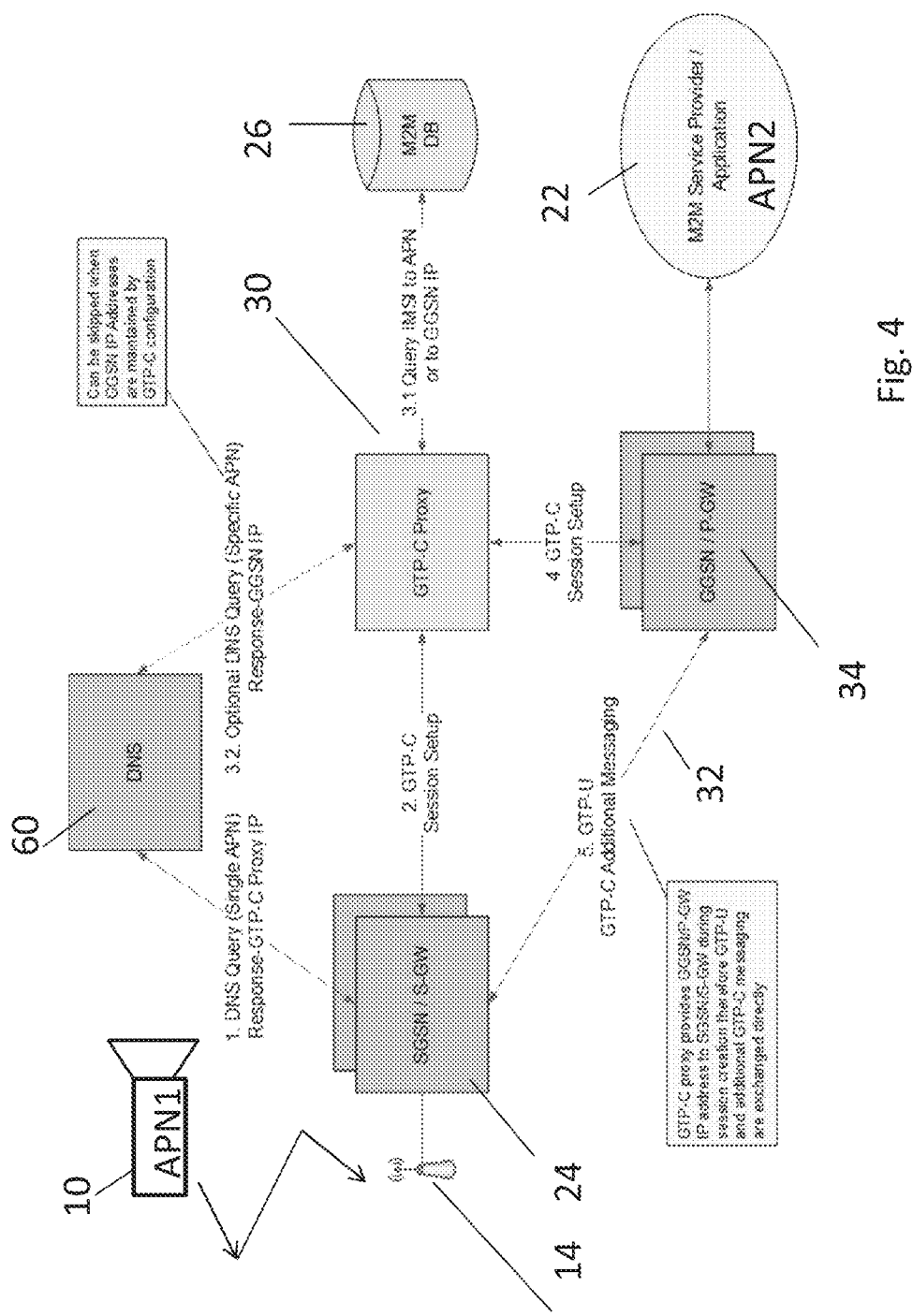
FIG. 4 is a simplified schematic diagram showing the embodiment of FIG. 1 in greater detail.

Reference is now made to FIG. 4, which illustrates the embodiment of FIG. 1 in greater detail. Parts that are the same as in FIG. 1 are given the same reference numerals.

Device 10 connects via base station 14 with SGSN gateway 24, causing a DNS lookup at DNS server 60. DNS server 60 directs the query to GTP-C relay/proxy 30. Device 10 is associated on the network with an international mobile subscriber identity (IMSI). GTP-C relay/proxy device 30, is connected to database 26 and using the database, relay/proxy 30 uses the IMSI as an index to find out if a modified APN has been assigned to the device. If so the GTP-C relay/proxy 30 modifies session setup messages by replacing the original access point name with an assigned access point name and a session is set up with APN 2 instead. The session itself is indicated by arrow 32 and does not involve the GTP-C relay/proxy once the session setup handshake is complete, or at least initial setup message and a reply have been exchanged.

GPT-C relay/proxy 30 may operate as a proxy for a GTP-Relay, by receiving GTP-C (Control) messages and modifying the GTP-C messages with the assigned APNs. The relay/proxy 30 may act as a GGSN towards SGSN 24 by terminating the GTP-C sessions, and initiating a new GTP session that replaces the terminated GTP session. The new session may be directed to GGSN 34 which connects server 22 into the network. More particularly, relay/proxy 30 may receive a Create-PDP-Context GPRS message which it terminates. The relay/proxy 30 then uses the assigned access point name to initiate a new Create-PDP-Context towards GGSN 34.

The relay/proxy 30 receives a response from GGSN 34 and sets the mobile network GGSN address of GGSN 34 as a destination address for a GTP-U stream—arrow 32, The GTP-U stream provides a communication tunnel for the IoT device to server 22. As the response is relayed to the SSGN 24 the GTP-C relay/proxy need play no further part in the communication.

Thus the GTP-C relay/proxy 30 serves to check the IMSI and use the IMSI as the basis to translate the APN if the APN has been changed since the machine was initially configured. The check can give the actual address after DNS translation is required.

The procedure is now described with reference to the flow numbers in the Figure.

Initially, M2M Device 10 requests PDN connectivity for its configured APN, APN1. Then—1—the SGSN/S-GW 24 queries the DNS server 60 for the IP address corresponding to the APN. The DNS responds with the GPT-C relay/proxy 30 IP address, which address is configured in the MNO authoritative DNS for example.

—2—the SGSN/S-GW 24 initiates a GTP-C PDP Context Create request to the GTP-C relay/proxy indicating the IMSI, APN and other GTP-C parameters.

Then in—3.1—the GTP-C relay/proxy 30 queries its M2M database 26, which is the GCDP in this figure, for the specific APN configured for the subscription, hence a specific APN, or a specific GGSN/P-GW IP address, here APN2.

Communication 3.2 occurs in the event that the case specific APN GGSN/P-GW IP address APN2 is not provisioned in the M2M database. In such a case, the GTP-C relay/proxy 30 initiates a DNS query for the specific APN to retrieve the IP address.

In—4—the GTP-C relay/proxy 30 initiates a PDP Context Create request to the GGSN/P-GW 34, with the modified APN information to a specific APN 22 configured in the GGSN/P-GW, indicating the original SGSN/S-GW IP address in the request.

The GGSN/P-GW responds with an Accept message to the GTP-C relay/proxy 30.

The GTP-C relay/proxy 30 responds to the SGSN/S-GW 24 with an Accept message indicating the GGSN/P-GW IP Address.

In—5—a GTP Session is established between SGSN/S-GW 24 and GGSN/P-GW 34, and GTP-U packets traverse directly between them and finally to the M2M Service Provider/Application 22.

Reference is now made to FIG. 5, which is a simplified diagram showing the embodiment of FIG. 2 in greater detail, in which both the GCDP 18 and the GTP-C relay/proxy 30 are used together and the DNS server 60 and HLR 62 are shown. Parts that are the same as in previous embodiments are given the same reference numerals and are not described again except as needed for an understanding of the present embodiment. Again, IoT device 10 (not shown) connects to the network 12 (not shown) and to SGSN 24. IoT device 10 is programmed internally to open a session with server 16 having address APN1. However the device is in fact required to open a session with server 22 having address APN2. Device 10 has an IMSI which is known to the network and the IMSI is used by GTP relay/proxy 30 as an index to look in database 26 to see if there is a modified APN set for that device. If there is then the replacement APN, APN2 is set. GCDP 18 translates APN1 to APN2. The newly assigned APN is used to provide a modified address for onward connection of IoT device 10, specifically for DNS lookup, which will be discussed in greater detail below with reference to FIG. 5. The GTP relay/proxy 30 sets up a GTP-U communication tunnel with server 22 as before and the tunnel operates via GGSN 34.

In use it is assumed that device 10 is originally configured for company 1 and is transferred at some stage to company 2. Device 10 is defined in HLR 62 as belonging to company 2, associated with APN 2. The device 10 itself still has APN1, so as it attempts to set up a session, both register and profile information arrive at SGSN 24. The profile has company 2 and APN2 but the register information from the device says company 1 and APN1. In these circumstances, SGSN 24 does not pass the session request on to server 60 for the DNS query.

Company 2 could thus add company 1 as an address in the HLR but they may not wish to do this. Furthermore, any change would apply to those machines that may have moved company but not other machines that may have been initially configured for company 2. Any change at the HLR would have to be undone for these other machines. The SGSN may in fact open the company 1 gateway, as the only gateway that is approved by the device 10.

The order of events may be as follows. As the device 10 connects with SGSN 24, a location update request goes to HLR 62 which in return sends a profile for the device. The profile may be changed by the GDCP 18 to substitute APN2 for APN1. The change in the APN is shown as OI replacement in the figure.

Virtual APN enables the network to allocate one or more APNs for M2M devices, where the device is no longer associated with the company or with the serving network that was initially configured into the device. The device APN may be substituted, dynamically on-line during the actual data communication setup session, with the APN associated with the currently associated company and/or the network.

The embodiments of FIGS. 1-5 are based on a device which is able to act as a GTP-Relay/Proxy. The relay/proxy receives and modifies GTP-C (Control) messages before passing them on. The relay/proxy may act as a GGSN, terminating the GTP-C sessions, and also as an SGSN, initiating GTP sessions towards the real GGSN, and may receive the Create-PDP-Context GPRS message, which is a request for a new data session. The relay/proxy may fetch the IMSI associated with the device from the GTP and may access the M2M subscriber database, which matches the IMSI with the corresponding company or service provider, who owns the IMSI. Then, the device may replace the APN in the GTP session with the APN associated with the company etc and may initiate a new Create-PDP-Context towards the real GGSN. The GTP-relay/proxy system may receive the response from the GGSN, and may relay the response to the originating SGSN, after setting the mobile network GGSN address as the destination address for the GTP-U (User plane, the actual user data) stream. The GTP session is thus transferred directly between the SGSN and GGSN, without GTP-relay/proxy intervention. At this point, the data session has been established using the converted APN.

In order for the GTP-C session to reach the GTP-relay/proxy system, its IP address may be configured in the authoritative DNS of the home network, or in another DNS in the DNS resolution chain, while the SGSN tries to resolve the APN configured in the device.

In another embodiment of the invention, there is the option to stay with the single APN and not modify it to a company-specific APN. This may be needed for the case where there is no viable option to configure the GGSN with all company APNs. In that case, the billing-per-company may be resolved by inserting a company-specific billing identifier to the GTP-C session, using the GTP-relay/proxy. The identifier may be inserted for example into the Charging Characteristics parameter of the GTP session. The identifier may then be transferred by the GGSN to the billing system and may be used for identifying the correct company, provider etc and its actual charging plan.

The architectures shown in FIGS. 4 and 5 are just two examples to which the present embodiments may be applied, and details may vary from operator to operator. The GTP-relay/proxy, the M2M database and the GCDP may be components of the invented system but all other components are network dependent.

It is expected that during the life of a patent maturing from this application many relevant network technologies will be developed and the scopes of the terms cellular network, diameter network, map network etc are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Networked apparatus for a cellular network, the apparatus configured for connection to mobile devices via said cellular network, the mobile devices being respectively associated on said network with device identification, the apparatus comprising a database associating device identifications with newly assigned access point names (APNs), the apparatus being configured to replace a respective original access point name with a respective newly assigned access point name obtained from said database using said device identification as an index, the mobile devices being respectively associated on said network with a device identity, the mobile devices being respectively configured with original access point names for onward connection;

the network apparatus being configured to:
replace a respective original access point name with an assigned access point name;
operate as a GTP-Relay/Proxy, the GTP-Relay/Proxy having a proxy address, said operating comprising:
receiving GTP-C(Control) messages;
modifying said GTP-C messages by said replacing; and
inserting said GTP-Relay/Proxy address as a proxy; and
relaying said modified messages to a GGSN;
receive a Create-PDP-Context GPRS message; and
use said assigned access point name to relay the Create-PDP-Context towards a GGSN in said network, the GGSN being one member of the group consisting of a GPRS Gateway service node in a 2G or a 3G network, and a packet data network gateway in a 4G network.

2. The networked apparatus of claim 1, wherein said device identity comprises an International mobile subscriber identity (IMSI).

3. The networked apparatus of claim 1, further configured to:
receive a response from said GGSN;
set a mobile network GGSN address of said GGSN as a destination address for a GTP-U stream, thereby to set up a communication tunnel for said respective mobile device; and
relay said response to an originating SGSN.

4. The networked apparatus of claim 1, wherein said mobile device is an Internet of Things (IoT) device.

5. The networked apparatus of claim 1, wherein said mobile device is a machine to machine (M2M) device connected to communicate with other devices.

6. Method for managing mobile devices on a cellular network, the mobile devices being respectively configured with original access point names for onward connection, the method comprising:
looking up a device identification on a network;
replacing a respective original access point name with an assigned access point name based on said look up of a device identification on the network; and
providing a modified address for onward connection of the respective mobile device based on said assigned access point name using said assigned access point name to set up a session for said respective mobile device with a server for further communication;
receiving a Create-PDP-Context GPRS message;
fetching an IMSI associated with a respective mobile device;
using said IMSI as a lookup for said database, therein to match the IMSI with the assigned access point name, therewith to replace the original access point name in the GTP session with the assigned access point name; and
using said assigned access point name to relay the Create-PDP-Context towards a GGSN in said network;
wherein said device identification is an International mobile subscriber identity number (IMSI); and
wherein said connecting for further communication comprises:
receiving a GTP-C(Control) message from a GTP-C session, the message having said original access point name;
modifying said GTP-C message by replacing said original access point name with said assigned access point name;
inserting a proxy address; and
relaying said GTP-C message following said modifying;
the GGSN being one member of the group consisting of a GPRS Gateway service node in a 2G or a 3G network, and a packet data network gateway in a 4G network.

7. The networked apparatus of claim 1, wherein the SGSN is one member of the group consisting of a serving GPRS support node in a 2G or a 3G network and a serving gateway in a 4G network.

8. The method of claim 6, wherein the SGSN is one member of the group consisting of a serving GPRS support node in a 2G or a 3G network and a serving gateway in a 4G network.

* * * * *